(12) United States Patent
Hutchison et al.

(10) Patent No.: US 9,088,520 B2
(45) Date of Patent: Jul. 21, 2015

(54) NETWORK IMPAIRMENT UNIT FOR CONCURRENT DELAY AND PACKET QUEUE IMPAIRMENTS

(71) Applicants: Michael D. Hutchison, Richmond (CA); Chiat Earl Chew, Vancouver (CA)

(72) Inventors: Michael D. Hutchison, Richmond (CA); Chiat Earl Chew, Vancouver (CA)

(73) Assignee: Ixia, Calabasas, CA (US)

( * ) Notice: Subject to any disclaimer, the term of this patent is extended or adjusted under 35 U.S.C. 154(b) by 284 days.

(21) Appl. No.: 13/627,325

(22) Filed: Sep. 26, 2012

(65) Prior Publication Data

US 2013/0070584 A1 Mar. 21, 2013

Related U.S. Application Data

(63) Continuation-in-part of application No. 13/234,060, filed on Sep. 15, 2011, now Pat. No. 8,520,529.

(51) Int. Cl.
*H04L 12/26* (2006.01)
*G06F 11/30* (2006.01)

(52) U.S. Cl.
CPC ............ *H04L 43/50* (2013.01); *G06F 11/3058* (2013.01); *H04L 43/10* (2013.01); *H04L 43/12* (2013.01)

(58) Field of Classification Search
None
See application file for complete search history.

(56) References Cited

U.S. PATENT DOCUMENTS

| 6,246,684 | B1 | 6/2001 | Chapman et al. |
| 6,625,689 | B2 | 9/2003 | Narad et al. |
| 6,717,917 | B1 | 4/2004 | Weissberger et al. |
| 7,593,345 | B2 | 9/2009 | Dubé et al. |
| 7,633,939 | B2 | 12/2009 | Curran-Gray et al. |
| 7,751,449 | B2 | 7/2010 | Winters |
| 8,711,705 | B1 * | 4/2014 | Johnson et al. ............... 370/241 |
| 2006/0088060 | A1 | 4/2006 | Fujikami et al. |

(Continued)

OTHER PUBLICATIONS

Spirent Communications, Spirent Gem Ethernet Network Impairment Emulators, Network Playback Module for CES, TOP, MEF-18, G.8261, article, http://www.spirent.com/~/media/Datasheets/Broadband/PAB/GEM_Impairments/GEM_NW_Playback_Module_for_CES_TOP_MEF-18_G8261_Datasheet.pdf, accessed Jan. 17, 2012. pp. 1-4.

(Continued)

*Primary Examiner* — Ian N. Moore
*Assistant Examiner* — Phong La
(74) *Attorney, Agent, or Firm* — SoCal IP Law Group LLP; John E. Gunther; Steven C. Sereboff

(57) ABSTRACT

An impairment unit and method of emulating network impairments is disclosed. The impairment unit may receive network traffic and transmit impaired network traffic. Received packets may be stored in a memory physically partitioned into a plurality of memory blocks and logically partitioned into a plurality of buffers. At least one buffer may be associated with each of a plurality of predefined impairment classes. One or more buffer may be a limited-length queue. Memory blocks may be assigned to buffers on an as-needed basis. A classifier may determine respective impairment classes of the received packets. A number of memory blocks assigned to each limited-length queue may be limited to a respective predetermined maximum. An enqueue manager may store each received packet and associated metadata in the buffer associated with the respective impairment class. The enqueue manager may discard received packets if the associated limited-length queue is full.

12 Claims, 7 Drawing Sheets

(56) References Cited

U.S. PATENT DOCUMENTS

| | | |
|---|---|---|
| 2006/0109796 A1* | 5/2006 | Koptiw et al. ............... 370/252 |
| 2006/0212633 A1* | 9/2006 | Kasper ........................ 710/260 |
| 2006/0256720 A1 | 11/2006 | Curran-Gray et al. |
| 2007/0230493 A1* | 10/2007 | Dravida et al. ............... 370/412 |
| 2008/0069002 A1* | 3/2008 | Savoor et al. ............... 370/241 |
| 2008/0168064 A1* | 7/2008 | Dorsey ........................... 707/9 |
| 2009/0003207 A1 | 1/2009 | Elliott |
| 2009/0116397 A1* | 5/2009 | Denby et al. ............... 370/252 |
| 2010/0195659 A1* | 8/2010 | Karaoguz et al. ............ 370/400 |
| 2011/0069745 A1* | 3/2011 | Thompson et al. .......... 375/224 |
| 2012/0008760 A1* | 1/2012 | Berkowitz et al. ....... 379/221.14 |
| 2012/0314704 A1* | 12/2012 | Karaoguz et al. ............ 370/389 |
| 2013/0058230 A1* | 3/2013 | Wvong et al. ............... 370/252 |
| 2013/0064095 A1 | 3/2013 | Chew et al. |
| 2014/0181611 A1* | 6/2014 | Currivan et al. ............. 714/751 |

OTHER PUBLICATIONS

Anonymous, Spirent XGEM 10Gigabit Ethernet Multi-Profile Network and Impairment Emulator V3.1, User Guide, Spirent Communications, Mar. 2009, document No. XP-002693593, pp. 1-211.

* cited by examiner

NETWORK IMPAIRMENT UNIT FOR CONCURRENT DELAY AND PACKET QUEUE IMPAIRMENTS

RELATED APPLICATION INFORMATION

This patent is a continuation-in-part of prior-filed copending non-provisional patent application Ser. No. 13/234,060, filed Sep. 15, 2011, entitled Reordering Network Traffic, now U.S. Pat. No. 8,520,529, which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to generating connections for testing a network or network device.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths.

In order to test a packet switched network or a device included in a packet switched communications network, test traffic comprising a large number of packets may be generated, transmitted into the network at one or more ports, and received at different ports. In this context, the term "port" refers to a communications connection between the network and the equipment used to test the network. The term "port unit" refers to a module within the network test equipment that connects to the network at a port. The received test traffic may be analyzed to measure the performance of the network. Each port unit connected to the network may be a source of test traffic, a destination for test traffic, or both a source of and a destination for test traffic. Each port unit may emulate a plurality of logical source or destination addresses. The number of port units and the communications paths that connect the port units to the network are typically fixed for the duration of a test session. The internal structure of the network may change during a test session, for example due to failure of a communications path or hardware device.

In order to test the capability of a network to survive or overcome a failure or other condition that impairs the performance of the network, impairments may be controllably introduced into the network. For example, voice over internet protocol (VoIP) networks may execute packet loss concealment strategies to replace packets that are lost during transmission over the network. To test such capability, a programmable impairment unit may be introduced into the network to cause a controlled number of packets to be dropped during transmission. An impairment unit may introduce other forms of impairment such as, for example, delaying packets for a fixed or randomly variable time period, reordering packets, introducing bit errors, duplicating packets, and other impairments.

Within this description, the term "logic" means a collection of hardware, which may be augmented by firmware and/or software, which performs a described function or set of functions. The term "logic" encompasses combinatorial logic and sequential logic such as, for example, state machines. All or portions of "logic" may be implemented by a micro-controller or other processor. Logic circuits may typically be designed using a hardware description language (HDL) that defines the logic circuits primarily in functional terms. The HDL design may be verified using an HDL simulation tool. The verified HDL design may then be converted into a gate netlist or other physical description of the logic circuits in a process commonly termed "synthesis". The synthesis may be performed automatically using a synthesis tool. The gate netlist or other physical description may be converted into process instructions and masks for fabricating the engine within an application specific integrated circuit (ASIC).

A gate netlist or other physical description of logic and logic circuits may be further converted into configuration data for implementing the logic circuits in a field programmable gate array (FPGA), a programmable logic device (PLD), or a programmable logic arrays (PLA), or other programmable semiconductor device, all of which will be referred to herein as "programmable circuit devices". Configuration data for programming a programmable circuit device may be stored in a memory or a machine readable storage medium and used to configure a programmable circuit device upon power-up of a test system. In this patent, the term "machine readable storage medium" means a physical medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" is not intended to encompass transitory media such as signals and waveforms that may convey digital data.

Within this description, the terms "unit" and "engine" also means collections of hardware, which may be augmented by firmware and/or software, which may be on a larger scale or have a more focused function than "logic". The terms "logic", "unit" and "engine" do not imply any physical separation or demarcation. All or portions of one or more logic circuits, units, and/or engines may be collocated on a common card, such as a network card, or within a common programmable circuit device, ASIC, or other circuit device.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

In block diagrams, arrow-terminated lines may indicate data paths rather than signals. Each data path may be multiple bits in width. For example, each data path may consist of 4, 8, 16, 64, 256, or more parallel connections.

DETAILED DESCRIPTION

Description of Apparatus

Figure 1:
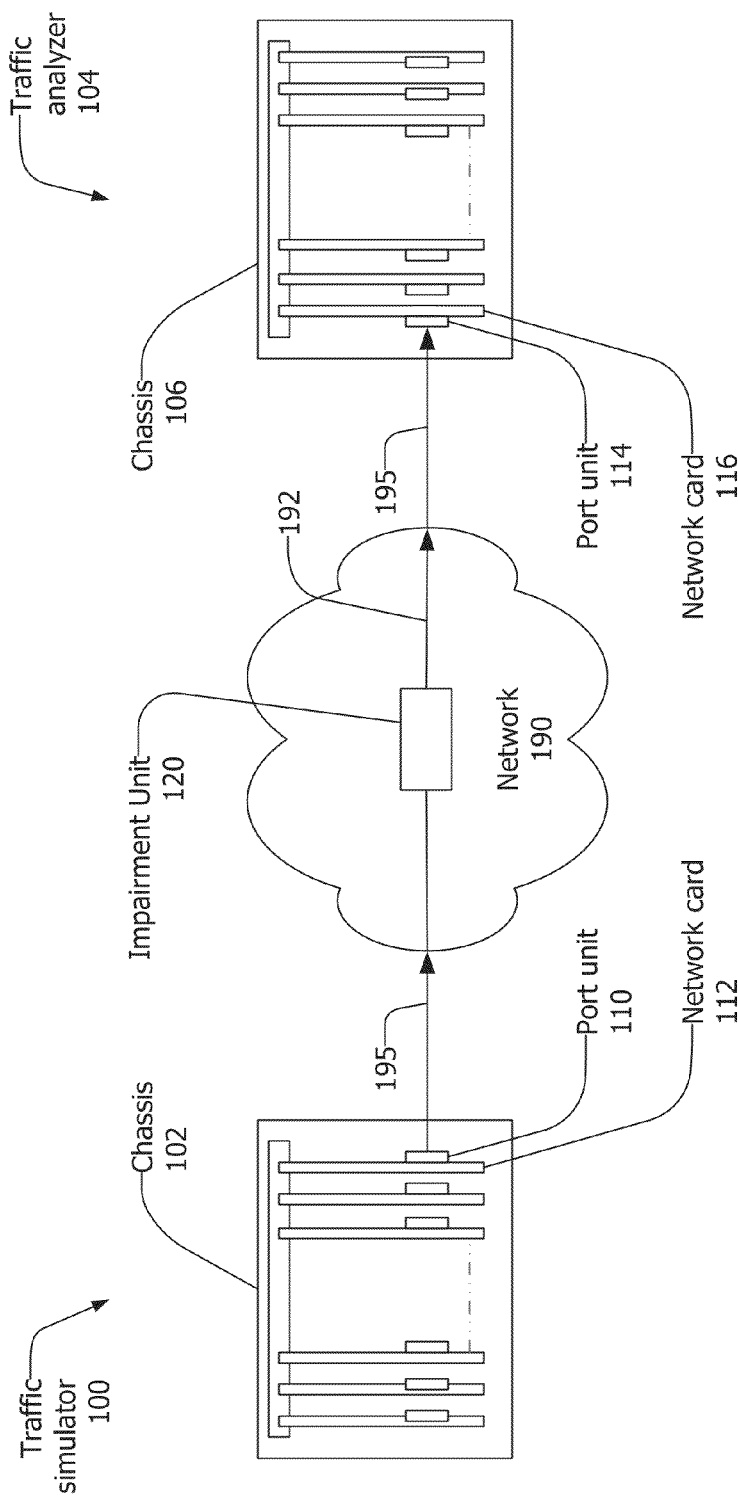
FIG. 1 is a block diagram of a network test environment.

FIG. 1 shows a block diagram of a network test environment. The network test environment may include a traffic simulator 100, a traffic analyzer 104, and a network 190. One or more impairment units 120 may be introduced into the network 190. The traffic simulator 100 may generate test traffic that is received by the traffic analyzer 104 via the network 190. The traffic simulator 100 and the traffic analyzer 104 may be separate physical units, as shown, or may be combined in a single unit the both generates and receives test traffic.

The traffic simulator 100 may be a network test device, performance analyzer, conformance validation system, network analyzer, or network management system. The traffic simulator 100 may be a portion of the network 190 or a device within the network 190 performing self-testing. The traffic simulator 100 may include one or more network cards 112 enclosed within a chassis 102. The chassis 102 may be a fixed or portable chassis, cabinet, or enclosure suitable to contain the network test equipment. The traffic simulator 100 may be an integrated unit, as shown in FIG. 1. Alternatively, the traffic simulator 100 may comprise a number of separate units cooperative to provide traffic generation and/or analysis.

The traffic analyzer 104 may be a network test device, performance analyzer, conformance validation system, network analyzer, or network management system. The traffic analyzer 104 may be a portion of the network 190 or a device within the network 190 performing self-testing. The traffic analyzer 104 may include one or more network cards 116 enclosed within a chassis 106. The chassis 106 may be a fixed or portable chassis, cabinet, or enclosure suitable to contain the network test equipment. The traffic analyzer 104 may be an integrated unit, as shown in FIG. 1. Alternatively, the traffic analyzer 104 may comprise a number of separate units cooperative to provide traffic generation and/or analysis.

The network cards 112, 116 may be permanently installed in the traffic simulator 100 and traffic analyzer 104 or may be removable. The network cards 112, 116 may include one or more field programmable gate arrays (FPGAs), application specific integrated circuits (ASICs), programmable logic devices (PLDs), programmable logic arrays (PLAs), processors, and other kinds of programmable circuit devices. In addition, the network cards 112, 116 may include software and/or firmware. The term network card encompasses line cards, test cards, analysis cards, network line cards, load modules, interface cards, network interface cards, data interface cards, packet engine cards, service cards, smart cards, switch cards, relay access cards, and the like. The term network card also encompasses modules, units, and assemblies that may include multiple printed circuit boards.

Each network card 112, 116 may contain one or more port unit 110, 114. Each port unit 110, 114 may connect to the network 190 through one or more ports. Each port unit 110, 114 may be connected to the network 190 through a communications link 195, which may be a wire, an optical fiber, a wireless link, or other communications link. Each network card 112, 116 may support a single communications protocol, may support a number of related protocols, or may support a number of unrelated protocols.

The network 190 may be a Local Area Network (LAN), a Wide Area Network (WAN), a Storage Area Network (SAN), wired, wireless, or a combination of these, and may include or be the Internet. Communications on the network 190 may take various forms, including frames, cells, datagrams, packets or other units of information, all of which are referred to herein collectively as "traffic" and individually as "packets". The network 190 may be comprised of numerous nodes interconnected by a mesh of communications paths, providing numerous physical and logical paths for data to travel. There may be plural logical communications paths between the traffic simulator 100 and the traffic analyzer 104.

The impairment unit 120 may be a separate physical device or a portion of one of the traffic simulator 100 and the traffic analyzer 104. The impairment unit 120 may be remotely located from the traffic simulator 100 and/or the traffic analyzer 104. The impairment unit 120 may be introduced into a designated communications path 192 within the network 190 such that at least some of the traffic from the traffic simulator 100 to the traffic analyzer 104 flows through the impairment unit 120. The impairment unit 120 may selectively impair some or all of the traffic that flows along the designated communications path 192. For example, the impairment unit 120 may selectively drop, delay, reorder, duplicate, and/or alter at least some packets that flow along the designated communications path 192.

The designated communications path 192 may be unidirectional, as shown in FIG. 1, or may be bidirectional. If the designated communications path 192 is bidirectional, the impairment unit 120 may be configured to selectively impair packets traveling in either direction (i.e. from left-to-right or right-to-left as shown in FIG. 1) or both directions along the designated communications path.

Figure 2:
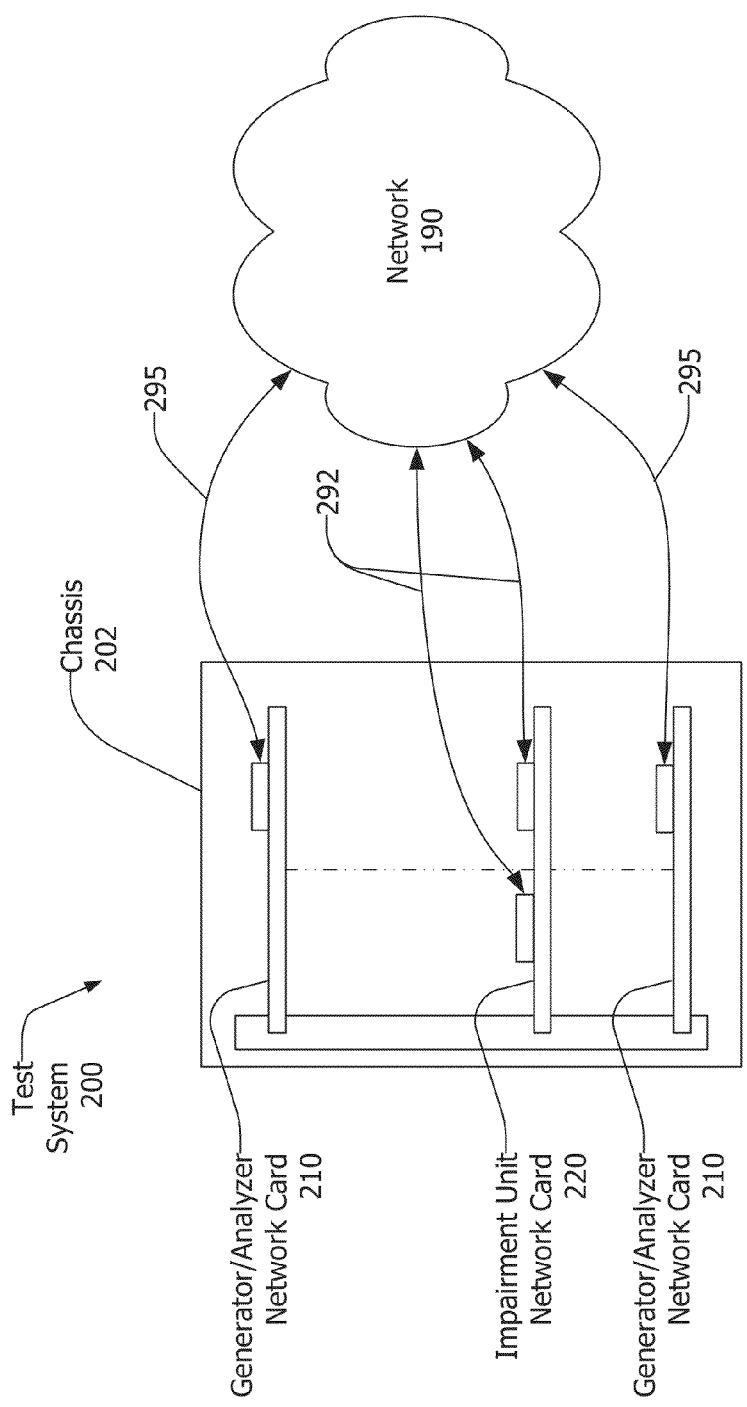
FIG. 2 is a block diagram of a network test environment.

Referring now to FIG. 2, another network test environment may include a test system 200 coupled to the network 190. The test system 200 may include a plurality of generator/analyzer network cards 210 enclosed within a chassis 202. Each generator/analyzer network card 210 may include one or more port units connected to the network 190 via respective bidirectional communications links 295. At least some of the generator/analyzer network cards 210 may generate test traffic for transmission via the network 190. At least some of the generator/analyzer network cards 210 may receive and analyze test traffic from the network 190. Some or all of the generator/analyzer network cards 210 may both generate and analyze test traffic. The plurality of generator/analyzer network cards 210 may collectively perform the functions of the traffic simulator 100 and traffic analyzer 104 of FIG. 1.

The test system 200 may include one or more impairment unit network cards 220. The impairment unit network card 220 may include two ports connected to the network 190 by a pair of communications links 292. In effect, a designated communications path within the network 190 may be broken and connected to the two ports of the impairment unit network card 220. The communications links 292 may be unidirectional or bidirectional, in which case the impairment unit network card 220 may be configured to selectively impair packets traveling in either or both directions.

Figure 3:
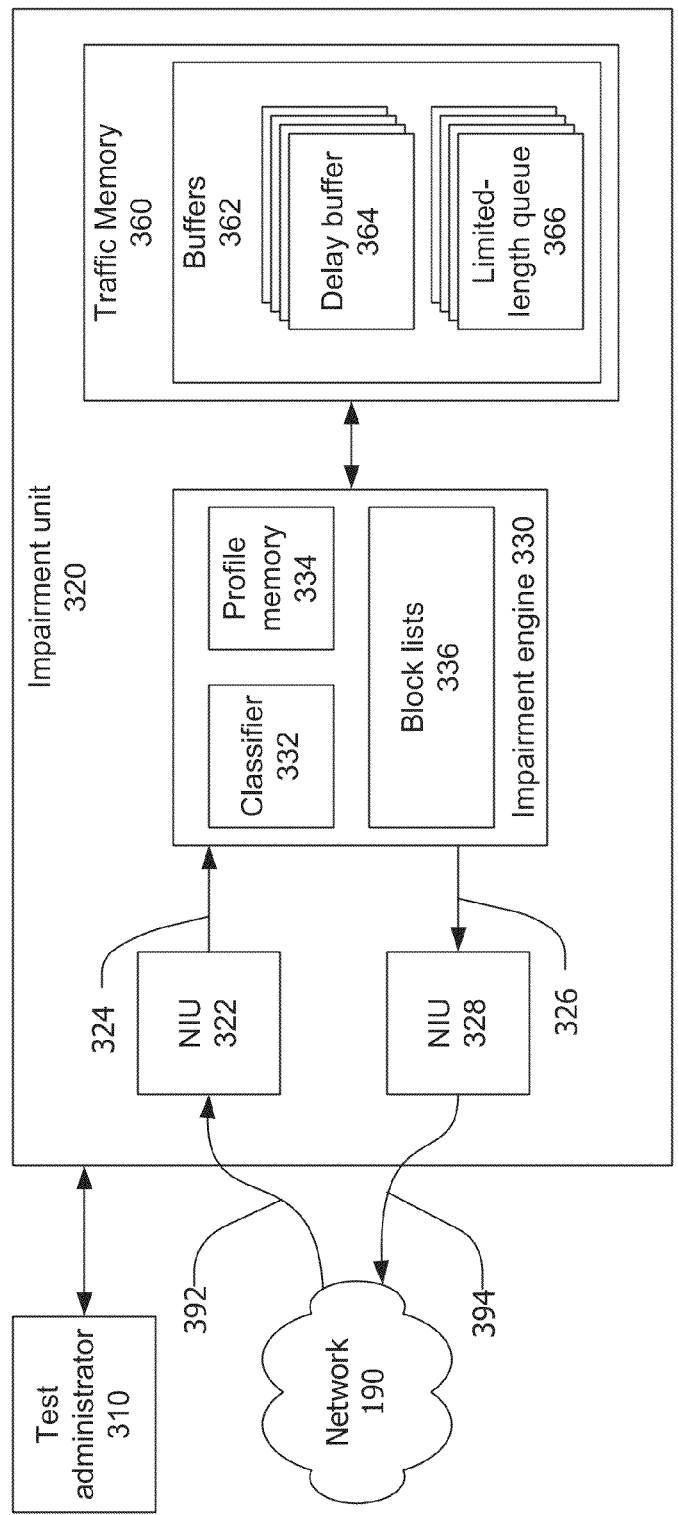
FIG. 3 is a block diagram of an impairment unit.

Referring now to FIG. 3, an impairment unit 320, which may be the impairment unit 120 or 220, may be coupled to the network 190 by two communications links 392, 394. The communications links 392, 394 which may be wires, optical fibers, wireless links, or other communication links. The impairment unit 320 may include a first network interface unit (NIU) 322, a second NIU 328, an impairment engine 330, and a traffic memory 360.

The first NIU 322 may receive electrical, optical, or wireless signals from the network 190 over the communications link 392, and may convert the received signals into incoming traffic 324 in a format usable to the impairment engine 330. Similarly, the second NIU 328 may convert outgoing traffic 326 from the impairment engine 330 into the electrical, optical, or wireless signal format required to transmit the test traffic to the network 190 via the communications link 394.

For ease of discussion, the impairment unit 320 shown in FIG. 3 operates in a half-duplex manner, receiving packets over the communications link 392 and transmitting packets over the communications link 394. An impairment unit may operate in a full-duplex manner, providing a bidirectional flow of packets between the communications links 392 and 394. A full-duplex impairment unit may use common hardware to process packets flowing in both directions. A full-duplex impairment unit may use separate hardware to process packets flowing in each direction, or a combination of common and separate hardware.

The impairment engine 330 may accept the incoming traffic 324 from the first NIU 322 and may temporarily store incoming packets in the traffic memory 360. The impairment engine 330 may subsequently read stored packets from the traffic memory 360 to form the outgoing traffic 326.

The impairment engine 330 may include a classifier 332 to classify packets within the incoming traffic 324 into a plurality of impairment classes. Each of the plurality of impairment classes may be uniquely associated with a corresponding one of a plurality of impairment profiles stored in a profile memory 334. The term "uniquely associated" means a one-to-one correspondence between impairment classes and impairment profiles. Each impairment profile may define one or more impairments to be applied to packets of the associated class. Each impairment profile may define both types of impairments and one or more parameters defining how each type of impairment is applied.

For example, an impairment profile may define that the packets in the associated class should be delayed by a time period specified in the impairment profile, or that a specified portion of the packets in the associated class should be delayed until one or more subsequently-received packets of the same class have been transmitted (thus causing the packets within the class to be reordered). An impairment profile may define multiple impairments to be applied to a class. For example, an impairment profile may define that all of the packets in the associated class are delayed by a predetermined time interval, 1% of the packets in the class are reordered, 0.1% of the packets in the class are duplicated, and bit errors are introduced into 0.01% of the packet in the class. One of the plurality of impairment classes may be a default class for traffic that will not be impaired.

One or more impairment profiles may indicate that packets from the corresponding impairment class be stored in a limited-length first-in first-out (FIFO) queue and then read from the queue in accordance with specific trigger conditions or events which will be described subsequently. The amount of memory allocated to a "limited-length" queue is subject to a constraint, or a maximum length. A "limited-length" queue differs from a "fixed length" queue in that the amount of memory occupied by a limited-length queue is not fixed. The actual memory allocated to a limited-length queue at any given instant may be any amount less than or equal to its maximum length. Any packet received while the corresponding queue is full (i.e. the maximum amount of memory has been allocated to the queue and there is insufficient space remaining to hold the received packet) may be discarded. An example of an impairment implemented using a queue is flow control, where packets may be read from the queue no more often than a specified flow rate. Another example of an impairment implemented using a queue is accumulate and burst, wherein packets are held in the queue for a specified time interval or until a specified number of packets are held and then transmitted as a "burst" or contiguous series of packets.

The profile memory 334 may be a contiguous block of memory such as random access memory. The profile memory 334 may be a plurality of registers, latches, or other memory circuits distributed within the impairment engine. The profile memory 334 may be a combination of random access memory, registers, latches, and other memory circuits.

The plurality of impairment profiles may be defined prior to a test session. For example, the plurality of impairment profiles may be defined by a test engineer using a test administrator computing device 310. Default impairment profiles may be provided in software associated with the test administrator computing device 310 and custom impairment profiles may be generated or defined by a user of the test administrator computing device 310. The impairment profiles may be transmitted to the impairment unit 320 from the test administrator computing device 310 before or during a test session. The plurality of impairment profiles may be transmitted from the test administrator computing device 310 to the impairment unit 320 prior to starting a test session.

The classifier 332 may classify each incoming packet based on the contents of the packet. For example, the classifier 332 may filter or parse the header of each packet and determine the class of each packet based on information such as IP source and destination addresses, source and destination ports, protocol, quality or type of service, and other data that can be extracted from the packet header. The classifier 332 may classify each incoming packet based on information contained in the payload of the packet. For example, the classifier 332 may simply read an impairment class field within the payload of each packet. The classifier 332 may determine an impairment class of each incoming packet in some other manner.

The impairment class determined by the classifier 332 may then be used as an index to retrieve the associated impairment profile from the profile memory 334. The impairment engine 330, in conjunction with the traffic memory 360, may then process each packet in accordance with the impairment class of the packet.

It should be understood that the phrase "process each packet" does not mean or imply that every packet is actually impaired. For example, if an impairment profile requires the introduction of bit errors into 0.01% of the packets in a corresponding impairment class, the impairment engine 330 may maintain a count of the received packets in the impairment class and cause a bit error in every 10,000$^{th}$ packet. The other packets in the impairment class may be retransmitted from the impairment unit without alteration. However, otherwise unaltered packets will incur at least a minimum delay as each received packet is stored in the traffic memory 360 and subsequently retrieved and transmitted by the impairment unit.

Figure 4:
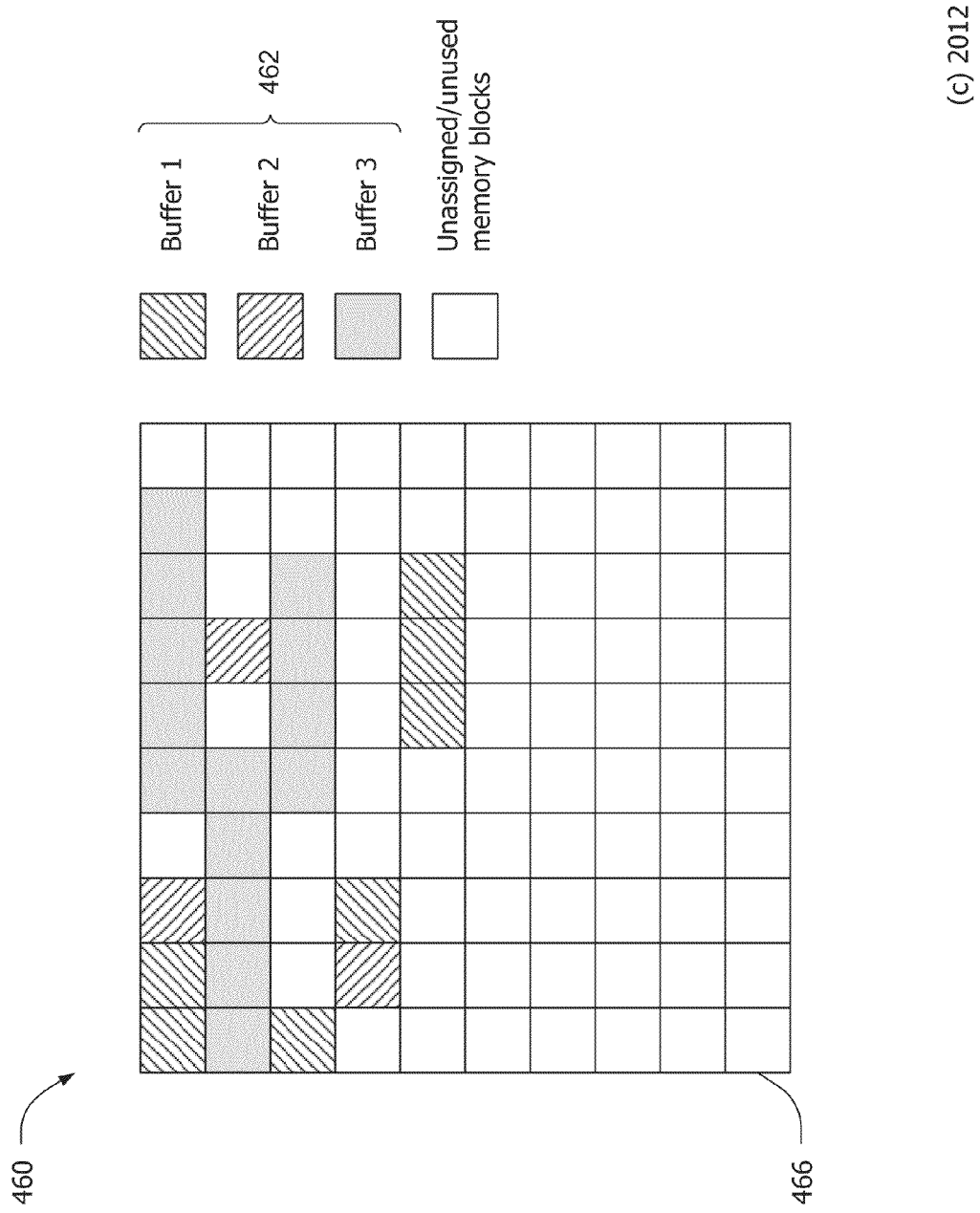
FIG. 4 is a graphical representation of a memory.

Referring now to FIG. 4, a traffic memory 460, which may be all or a portion of the traffic memory 360, may be physically partitioned into a large plurality of equal-length memory blocks, of which memory block 466 is representative. "Physically partitioned" means the hardware of each block is distinct from the hardware of each other block. "Physically partitioned" does not mean that the blocks are separate circuit devices; some or all of the blocks may reside within the same memory integrated circuits. Typically, each block will consist of a contiguous portion (i.e. a contiguous block of addresses) within the traffic memory 460. The length of each block may be, for example, longer than the shortest expected packets but not necessarily as long as the longest expected packets. In the example of FIG. 4, the traffic memory 460 has been partitioned into 100 memory blocks. A traffic memory may be partitioned in more or fewer memory blocks. For example, the traffic memory 460 may contain 100 MB to several GB of memory and may be physically partitioned into 1 KB to 10 KB blocks. A 1 GB traffic memory 460 may be partitioned into 250,000 4 KB blocks.

The Traffic memory 460 may also be logically and dynamically partitioned into a plurality of buffers 462. "Logically partitioned" means that the partitions are not necessarily physically contiguous. In this example, the traffic memory 460 is logically partitioned into three buffers labeled Buffer 1, Buffer 2, Buffer 3. A traffic memory may be logically partitioned into more or fewer than three buffers. "Dynamically partitioned" means that the partitions may change over time. In particular, the number and identity of the memory blocks assigned to each logical partition may change over time in response to the traffic received by the impairment unit 320. At the instant of time represented in FIG. 4, seven memory blocks are assigned to Buffer 1, 3 memory blocks are assigned to Buffer 2, and 14 memory blocks are assigned to Buffer 3. The remaining 76 memory blocks are unassigned.

Referring back to FIG. 3, the traffic memory 360 may be logically and dynamically divided into a plurality of buffers 362. Each buffer 362 may function as a first-in, first-out (FIFO) queue. Each buffer 362 may be associated with and dedicated to storing packets from a corresponding impairment class. At least one buffer 362 may be associated with each impairment class that is active for a given test session. At described in copending patent application Ser. No. 13/234, 060, an impairment class that implements packet reordering may be associated with separate buffers for packets to be reordered and packets that will not be reordered.

Each buffer 362 may be composed of one or more physical blocks of memory, which may not be contiguous. Blocks of memory may be assigned to each buffer 362 on an as-needed basis. For example, when a first packet arrives, the buffer for the corresponding impairment class may be assigned a first block of memory. If the first block of memory becomes full, a second block of memory may be assigned to the buffer memory. Additional blocks may be assigned as each preceding block becomes full. When the first block of memory is emptied (by transmitting the packets stored in that block), it may be released for use in a different buffer for a different impairment class. In this way, the buffers for the plurality of impairment classes are automatically assigned a sufficient number of memory blocks to store the packets actually received.

Packets and related metadata may be stored contiguously in the memory blocks assigned to a given buffer 362. Two or more short packets may be stored in a single memory block. A short or long packet may be divided between two or more memory blocks.

The impairment unit may maintain a plurality of blocks lists 336. Each block list 336 may identify, in sequence, the memory blocks assigned to a corresponding one of the buffers 362. The impairment unit may also maintain a list (not shown in FIG. 3) of unallocated memory blocks.

Each buffer 362 may be configured as either a delay buffer 364 or a limited-length queue 366. Packets stored in a limited-length queue 366 are not subject to a maximum delay time. However, packets from an impairment class associated with a limited-length queue 366 may be dropped if the corresponding limited-length queue is full.

Packets stored in a delay buffer 364 may be subject to maximum configurable delay time to ensure that the traffic memory 360 is never completely filled. The communications links 392, 394 typically operate at a fixed data rate commonly termed the "line rate" of the link. For example, these links may be Ethernet links that operate at a fixed line rate of 10 MHz, 100 MHz, 1 GHz, 10 GHz, 40 GHz, or 100 GHz. The fixed line rate of a link is commonly referred to as the "bandwidth" of the link. The full bandwidth of each link is not necessarily used at all times. However, when a link operates at "50% bandwidth" the link conveys data at the line rate 50% of the time, rather than conveying data at 50% of the line rate. Further, the full bandwidth of each link in not necessarily used for transmitting packet data. The communications links 392, 394 may use physical and link layer protocols that require overhead (e.g. inter-packet gaps, synchronization headers, etc.) that consume a portion of the link bandwidth. Thus the effective line rate for packet data may be lower than the actual line rate of the communications links 392, 394.

Assuming that no packets are read and removed from the traffic memory 360, and assuming that only packet data is stored in the memory, the time required to fill the entire memory is given by the equation $$t = d/r \quad (1)$$

where
  t=time required to fill the memory available for storing packet data,
  d=memory, in bits, available to store packet data, and
  r=effective line rate in bits/second.

For example, if the effective line rate is 10 GHz and the memory available to store packet data is 1 GB, the time required to fill the available memory is 800 milliseconds. So long as the maximum configurable delay allowed in the impairment unit is less than 800 milliseconds, the traffic memory 360 will never fill completely, and there will always be memory space available in which to store received packets.

In practice, some overhead data may be stored in the traffic memory 360 along with packet data. For example, metadata such as a timestamp and/or a serial number and an overall data length may be stored in association with each received packet. The effect of the overhead data is to effectively reduce the amount of memory available for storing packets. For example, if the effective line rate is 10 GHz, the memory available to store packet data is 1 GB, and the overhead is, on average, 25% of the data to be stored, the maximum configurable delay is about 600 milliseconds.

Since packets stored in limited-length queues 366 are not subject to a maximum configurable delay, the amount of memory guaranteed to available for delay buffers 364 may be less than the total size of the traffic memory 360. For example, if one impairment class is associated with a limited-length queue 366 with a maximum size equal to one-half of the traffic memory 360, only the other half of the traffic memory 360 is guaranteed to be available for delay buffers 364. The maximum configurable delay may still be calculated as discussed above, defining d in equation (1) as the amount of memory, in bits, available for delay buffers 364, which is to say the total size of the traffic memory 360 less the total of the maximum lengths of all limited-length queues 366.

Figure 5:
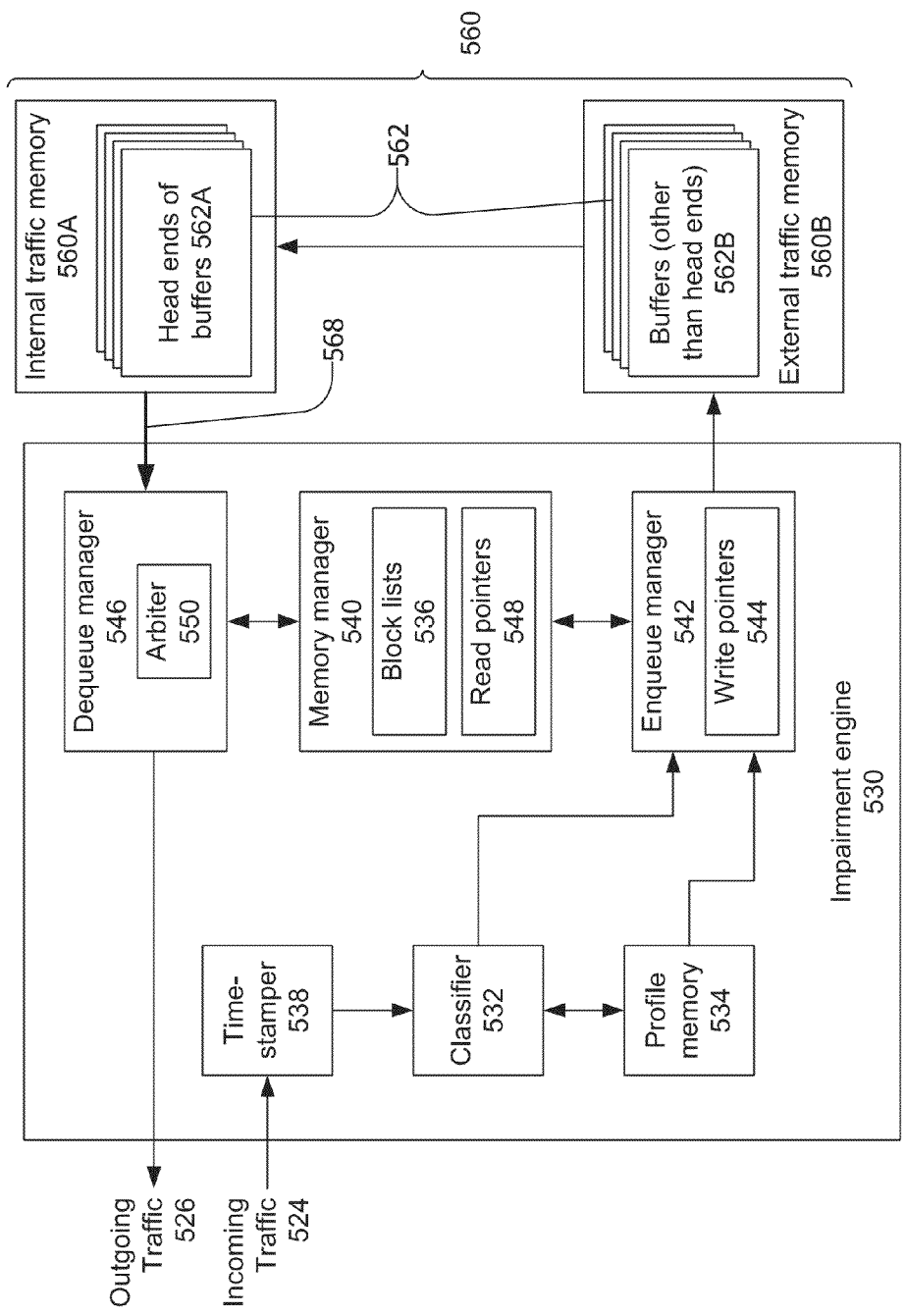
FIG. 5 is a block diagram of an impairment engine.

FIG. 5 provides a more detailed block diagram of portions of an impairment unit including an impairment engine 530 and a traffic memory 560, which may be the impairment engine 330 and traffic memory 360, respectively.

The impairment engine 530 may include a classifier 532 and a profile memory 534 which may function as described for the counterpart elements of FIG. 3. The impairment engine 530 may also include a time-stamper 538 to associate a receive timestamp with each packet in the incoming traffic 524. The impairment engine 530 may include an enqueue manager 542 to control how packets and related metadata are written into the traffic memory 560 and a dequeue manager 546 to control the order in which packets are read from the traffic memory 560 to form the outgoing traffic 526.

The impairment engine 530 may be implemented in one or more circuit devices such as an application specific integrated circuit or a field programmable gate array. The traffic memory 560 may be partitioned into internal traffic memory 560A and external traffic memory 560B. The internal traffic memory 560A may be internal to the circuit device containing all or a portion of the impairment engine. The external traffic memory 560B may be contained in circuit devices, such as static or dynamic random access memory chips, external to the circuit device or devices containing the impairment engine 530.

The internal traffic memory 560A may store the head ends of the buffers 562A. The interface between the internal traffic memory 560A and the dequeue manager 546 may use a wide bus, as indicated by the bold line 568, such that the dequeue manager 546 may read metadata (e.g. transmit timestamps, sequence numbers, etc.) associated with the packets at the head ends of the buffers 562A in parallel. Since the metadata for all of the head-end packets is read in parallel, the dequeue manager 546 may compare the metadata and select a single packet for transmission within a single memory cycle. For example, logic within the dequeue manager 546 may simultaneously compare the transmit timestamps of all the head-end packets to select the packet or packets with the lowest transmit timestamp. Although not shown in FIG. 5, delayed traffic to be reordered may be stored separately in the internal traffic memory 560A, as described in patent application Ser. No. 13/234,060.

The amount of internal traffic memory 560A assigned to each buffer 562A may be, for example, sufficient to only store all or a portion of the head-end packet. The external traffic memory 560B may store the balance of the buffers 562B, which is to say all of the buffers except the head ends stored in the internal traffic memory 560A.

The impairment engine 530 may include a memory manager 540 to control the flow of packets between the impairment engine 530 and the traffic memory 560 and the flow of packets from the external traffic memory 560B to the internal traffic memory 560A. Initially, received packets and their associated metadata may be stored in the internal traffic memory 560A until the capacity of that memory is used. Subsequently received packets and associated metadata may be stored in the external traffic memory 560B. Whenever a packet is read from the head end of a buffer 562A for transmission, the memory manager 540 may move a replacement packet from the corresponding buffer 562B in the external traffic memory 560B to the corresponding buffer 562A in the internal traffic memory 560A. The memory manager 540 may maintain a plurality of read pointers, each uniquely associated with one of the plurality of buffers 562B. Each read pointer may provide a memory address indicating where packet data will next be read from the corresponding buffer 562B in the external traffic memory 560B.

The memory manager 540 may also maintain blocks lists 536 associated with each buffer 562B in the external traffic memory 560B. Each block list may identify, in sequence, physical memory blocks assigned to the associated buffer 562B. The memory manager 540 may also maintain a list of unassigned memory blocks in the external traffic memory 560B.

The enqueue manager 542 may associate metadata with at least some of the received packets and then store the metadata and packets in the traffic memory 560. If a given buffer is empty (for example at the start of a test session), the enqueue manager may store a received packet directly into the internal traffic memory 560A as the head-end packet for the given buffer. If a given buffer already holds at least one packet (the head-end packet) the enqueue manager 542 may store the received packet and metadata in the external traffic memory 560B.

The enqueue manager 542 may use the receive timestamp provided by the time-stamper 538 to associate a transmit timestamp with each delayed packet. For example, the enqueue manager 542 may add a desired delay time to the receive timestamp to generate a transmit timestamp for a delayed packet. The enqueue manager may also associate a sequence number, indicating an order within each impairment class, with each packet. The transmitted timestamp and the sequence number may be stored as metadata associated with each packet. The enqueue manager 542 may include logic to reorder selected streams of packets by changing the relative order in which the packets are written into and read from the traffic memory. Copending patent application Ser. No. 13/234,060, previously incorporated by reference, describes how the timestamp and the sequence number associated with each packet may be used to control how packets are delayed and reordered within an impairment unit such as the impairment unit 320. The enqueue manager 542 may also include logic to introduce jitter into selected streams of packets by randomly altering the delay times of successive packets within an impairment class.

The impairment engine 530 may also include logic, within the enqueue manager 542 or the dequeue manager 546, to impair selected impairment classes by introducing bit errors into transmitted packets, by dropping packets (not transmitting received packets), and/or by duplicating packets (transmitting received packets multiple times).

The enqueue manager 542 may maintain a plurality of write pointers, each uniquely associated with one of the plurality of buffers 562B. Each write pointer may indicate a memory address where packet data will next be written into the corresponding buffer. Each time packet data or metadata is written into one of the plurality of buffers 562B, the corresponding write pointer may be advanced to the next memory address. When the write pointer for a given buffer reaches the end of a physical memory block, the enqueue manager 542 may request the memory manager 540 to assign an additional physical memory block to the given buffer.

As previously described, one or more of the buffers 562 may be defined as a limited-length queue. The number of physical memory blocks that may be assigned to each limited-length queue at any given time may be limited to a respective maximum number of blocks. The respective maximum number of blocks available to each limited-length queue may be defined, for example, in the profile for the corresponding impairment class. The enqueue manager 542 may store received packets in a limited-length queue as the packets are received, requesting additional memory blocks as needed until the maximum number of memory blocks has been assigned. If the maximum number of memory blocks has been assigned to a given limited-length queue and the remaining space will not hold a newly received packet, the newly received packet may be dropped.

The dequeue manager 546 may control reading packets from the head ends of buffers 562A for inclusion in the outgoing traffic 526. The dequeue manager may select a packet at the head end of one of the plurality of buffers 562A to be read and added to the outgoing traffic 526.

The buffers 562 may include both delay buffers and limited-length queues. The dequeue manager 546 may select packets from the head ends of delay buffers based upon metadata including a transmit timestamp and a sequence number associated with each packet as described in copending patent application Ser. No. 13/234,060. In general, the dequeue manager may select the packet having the earliest transmit timestamp unless there is a reordered packet ready for transmission.

The dequeue manager may select packets from limited-length queues based upon the occurrence of a trigger event associated with each limited-length queue. Packets stored in a limited-length queue may not be subject to a maximum configurable delay but may be held for an unlimited time period until the trigger event causes one or more packets to be read from the limited-length queue for transmission. The trigger event may be, for example, a predetermined time point, passage of a predetermined time interval, or receipt of a predetermined number of total length of packets. A unique trigger event may be associated with each limited-length queue. The trigger even may be defined, for example, in the impairment profile for the corresponding impairment class.

For example, to implement flow control for an impairment class, the trigger event may be the passage of a predetermined time interval. To limit the flow for an impairment class to 100 packets per second, the trigger event may occur 10 milliseconds (or its equivalent in internal time intervals) after the transmission of a previous packet from the impairment class. When the trigger event occurs, the dequeue manager 546 may read a single packet from the corresponding limited-length queue for transmission.

For another example, to implement an accumulate-and-burst impairment, the trigger event for an impairment class may be the receipt of a predetermined number of packets or receipt of a predetermined total length of packets. Once the trigger event occurs, the dequeue manager may sequentially read and output all of the packets stored in the corresponding limited-length queue.

The dequeue manager 546 may include an arbiter 550 to determine which packet to output if two or more packets are eligible to be output at the same time. For example, the arbiter 550 may select one of two packets having identical transmit timestamp. For further example, the arbiter 550 may select one limited-length queue to output packets when trigger event have occurred for two or more limited-length queues. The arbiter 550 may apply arbitration rules to determine the order in which the packets are transmitted. As an example of a set of arbitration rules, a limited-length queue implementing an accumulate and burst impairment may have priority over any other buffer, and a limited-length queue implementing flow control may have priority over a packet from a delay buffer. Other arbitration rules may be used.

Description of Processes

Figure 6:
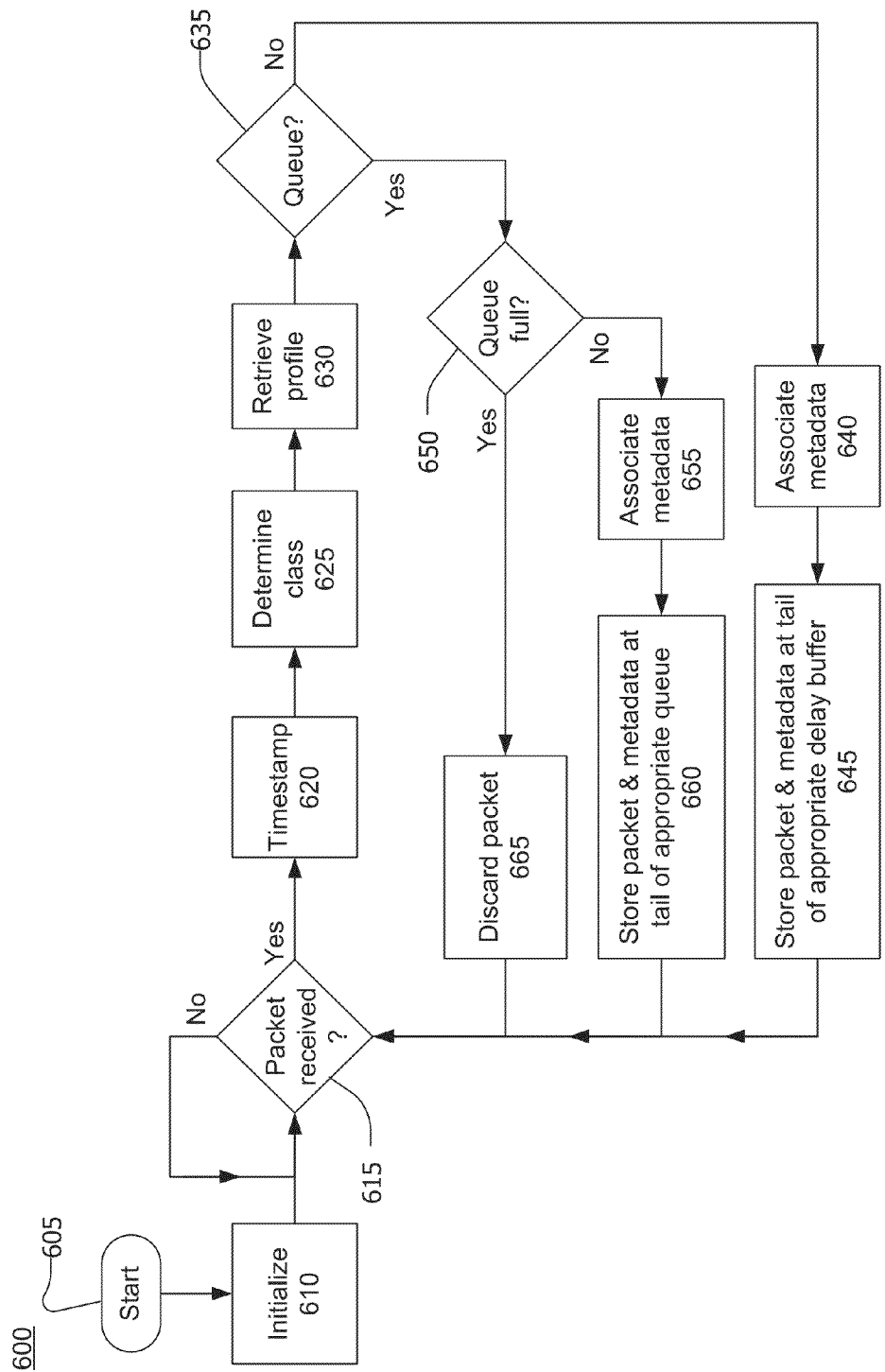
FIG. 6 is a flow chart of a process for receiving network traffic in an impairment unit.

FIG. 6 is a flow chart of a process 600 for receiving packets within an impairment unit such as the impairment units 120, 220, 320. The process 600 may be performed in parallel with a process 700 for transmitting packets from an impairment unit, which will be subsequently described in conjunction FIG. 7. The process 600 may start at 605 after the impairment unit has been inserted into a communications path within a network under test and a test session has been initiated. The process 600 may operate continuously until the test session has been completed. The process 600 may be cyclic in nature and the actions from 615 to 665 may be performed cyclically for each received packet. Although shown as a series of sequential actions for ease of description, the process 600 may be performed wholly or partially as a pipeline such that multiple actions may be performed concurrently on different received packets. The process 600 may be performed by hardware or a combination of hardware and software within the impairment unit.

At 610, the impairment unit may be initialized by loading classification rules into a classifier, such as the classifier 332. The classification rules may define a plurality of impairment classes. At 610, an impairment profile associated with each of the plurality of impairment classes may be loaded into a profile memory, such as the profile memory 334. Initializing the impairment unit may also include logically partitioning a traffic memory, such as the traffic memory 360, into a plurality of buffers including at least one buffer associated with each of the plurality of impairment classes. At least some of the plurality of buffers may be defined to be limited-length queues, each subject to a respective maximum total queue length. The other buffers may be delay buffers that are not limited to a specific maximum length.

The process 600 may loop at 615 until a packet is received. When a packet is received, a received timestamp may be assigned to the received packet at 620, and an impairment class of the received packet may be determined at 625. The impairment class determined at 625 may be one of the plurality of impairment classes defined by the classification rules loaded at 610. The impairment class of the received packet may be determined based upon information contained within the received packet. For example, the impairment class of the received packet may be determined based on fields within the packet header, or based on test data embedded within the packet payload, or in some other manner.

After the impairment class of the received packet is determined at 625, an impairment profile associated with the impairment class may be retrieved at 630. The impairment profile may contain information indicating what impairments, if any, should be applied to the packets within the impairment class. Impairment profiles may be modified during a test session.

At 635, a determination may be made whether or not the packet received at 615 should be stored in a limited-length queue or in a delay buffer. The determination may be made based on the impairment class determined at 625 and/or the impairment profile retrieved at 630.

When a determination is made at 635 that the received packet will not be stored in a limited-length queue, metadata may be defined and associated with the packet at 640. The metadata attached at 640 may subsequently determine when the packet is read from the traffic memory. Metadata associated with a packet may be stored contiguously with the packet in the delay buffers associated with the impairment class of the packet, or may be stored separately from the packet. The metadata associated with the packet at 640 may include a transmit timestamp determined by adding a delay to the receive timestamp attached to the packet at 620. The transmit timestamp may indicate a target transmit time for the associated packet. The transmit timestamp may be determined based, at least in part, on the impairment class of the received packet and the impairment profile retrieved at 630. For example, when the impairment profile from 630 indicates that the packets within the impairment class are not impaired, the transmit timestamp may be determined at 640 by adding a fixed latency to the value of the receive timestamp from 620. The fixed latency may be the minimum time required for an impairment unit to receive, process, and transmit a packet. When the impairment profile from 630 indicates that all packets within the impairment class should be delayed by a predetermined delay time greater than the fixed latency, the transmit timestamp may be determined at 640 by adding the predetermined delay time to the receive time stamp from 620. When the impairment profile indicates that jitter should be introduced into the impairment class, the transmit time stamp may be determined at 640 by adding a randomly generated delay time to the receive time stamp from 620. Both a predetermined delay time and a randomly generated delay time may be added to the received time stamp if required by the impairment profile.

The metadata associated with the received packet at 640 may include a sequence number indicating the order of the packet within the respective impairment class. When the impairment profile retrieved at 630 indicates that the packet should be reordered, the sequence number associated with the packet at 640 may be altered to cause the packet to be transmitted after one or more subsequently received packets in the same impairment class. Copending patent application Ser. No. 13/234,060, previously incorporated by reference, describes the use of sequence numbers and timestamps to effect reordering in an impairment unit.

At 645, the received packet and associated metadata may be stored in the delay buffer associated with the impairment class of the received packet. The process may then return to 615 to await reception of another packet.

When a determination is made at 635 that the received packet will be stored in a limited-length queue, a further determination may be made at 650 if the limited-length queue associated with the impairment class of the received packet is full. If the associated limited-length queue is full, or lacks sufficient free memory space to hold the received packet, the received packet may be discarded at 665. The process may then return to 615 to await reception of another packet.

When a determination is made at 650 that the limited-length queue associated with the impairment class of the received packet is not full, metadata may be associated with the received packet at 655. The received packet and the associated metadata may be stored at the tail of the associated limited-length queue at 660 and the process may then return to 615 to await reception of another packet. The process may continue cyclically until the test session is complete.

The metadata associated with the received packet at 655 may include a transmit timestamp indicating a future time when the received packet should be de-queued (i.e. read from the limited-length queue) and transmitted. For example, an accumulate and burst impairment may be implemented by assigning a timestamp representing a future time to a first packet within an impairment class and subsequently assigning the same transmit timestamp to one or more later-received packets of the same impairment class. For further example, flow control may be implemented by assigning each packet in an impairment class a transmit timestamp that is not based on the receive timestamp assigned to the packet at 620, but is generated by adding a fixed or packet-length dependent time interval to the transmit timestamp of the previous packet in the impairment class. Other forms of queue impairment may be implemented, at least in part, by associating other metadata with each packet.

Figure 7:
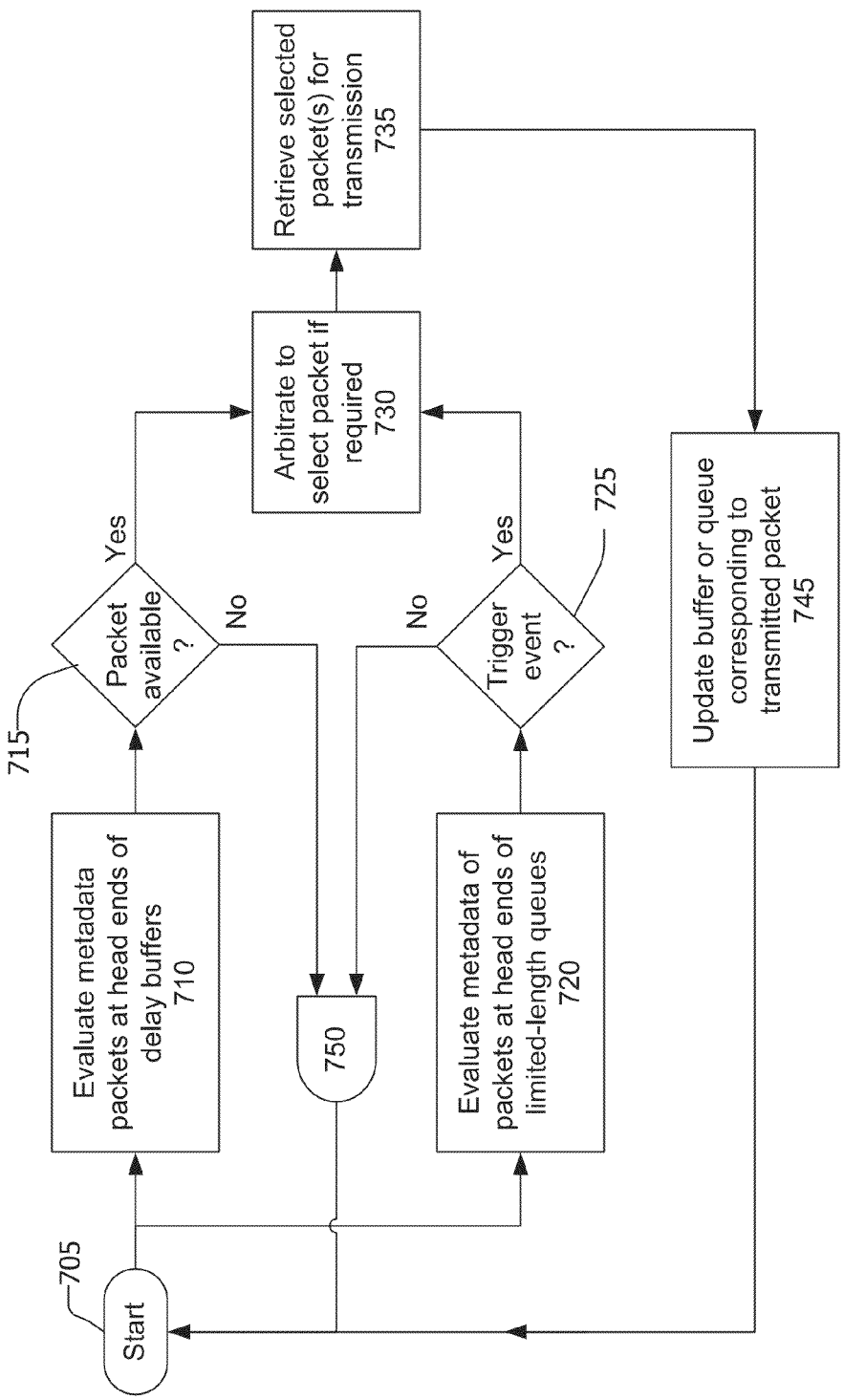
FIG. 7 is a flow chart of a process for transmitting impaired traffic in an impairment unit.

FIG. 7 is a flow chart of a process 700 for transmitting packets within an impairment unit such as the impairment units 120, 220, 320. The process 700 may be performed in parallel with the previously-described process 600 for receiving packets at impairment unit. The process 700 may start at 705 after the impairment unit has been inserted into a communications path within a network under test and a test session has been initiated. The process 700 may operate continuously until the test session has been completed. The process 700 may be cyclic in nature and the actions from 705 to 750 may be performed cyclically for each received packet. Although shown as a series of sequential actions for ease of description, the process 700 may be performed wholly or partially as a pipeline such that multiple actions may be performed concurrently on different received packets. The process 700 may be performed by hardware within the impairment unit.

The process 700 may start at 705 when a test session is initiated. At 710, the metadata at the head ends of one or more delay buffers may be read and evaluated. The metadata read at 710 may include a transmit timestamp associated with a packet at the head end of each virtual FIFO buffer. Other metadata, such as sequence number, associated with each head-end packet may also be read at 710.

At 715, a determination may be made whether or not one or more packet from a delay buffer is available for transmission. Specifically, if one or more transmit timestamp read at 710 is less than or equal to a present time, the associated packets are ready for transmission. The present time may be provided by an internal clock within the impairment unit, which may also be used to assign receive timestamps to incoming packets at 620 in the process 600. If the transmit timestamps associated with the packets at the head ends of all of the delay buffers are greater than the present time, no packet is available for transmission.

In parallel with the action at 710, the metadata at the head ends of one or more limited-length queues may be read and evaluated at 720. The metadata read at 720 may include a transmit timestamp associated with a packet at the head end of each limited-length queue. Other metadata associated with each head-end packet may also be read at 710.

At 725, a determination may be made whether or not a trigger event has occurred for one or more of the limited-length queues. A trigger event may be the passage of a predetermined time interval, the accumulation of a predetermined number of packets or total length of packets, or some other criterion. The criteria used to determine if a trigger event has occurred may be different for each limited-length queue. If a trigger event has not occurred, no packet is available for transmission. If a trigger event has occurred, one or more packets may be available for transmission.

When the determination at both 715 and 725 (as indicated by the AND gate 750) is that no packet is available for transmission, the process 700 may return to 705. The process 700 may repeat from 705 every cycle of an internal clock.

When the determination at 715 and/or 725 is that one or more packets are available for transmission, arbitration may be performed at 730 to select a single packet to be transmitted. Arbitration may be performed using predetermined arbitration rules. Example arbitration rules include "packets from a limited-length queue implementing an accumulate and burst impairment have priority", "the packet with earliest transmit timestamp has priority", "when two packets have the same transmit timestamp, a packet from a limited-length queue has priority over a packet from a delay buffer", and/or "when two packets from limited-length queues have the same transmit timestamp, the packet from the queue with least available space has priority". Numerous other arbitration rules may be defined and applied at 730 to select a single packet.

The packet selected at 730 may be retrieved from memory at 735 and forwarded for transmission (for example, via a network interface unit such as the second NIU 328). At 745, the limited-length queue or delay buffer corresponding to the transmitted packet may be updated to reflect the transmission of the packet. Updating the limited-length queue or delay buffer may include updating a read pointer to indicate a new memory location from which to begin reading the next packet. When appropriate, updating the limited-length queue or delay buffer may include moving a packet from an external memory such as the external traffic memory 560B to an internal memory such as the internal traffic memory 560A. The process 700 may then repeat from 705 on the next clock cycle to select the next packet to be transmitted.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An impairment unit, comprising:
a network interface to receive network traffic from a network and to transmit impaired network traffic to the network;
a traffic memory physically partitioned into a plurality of memory blocks and logically partitioned into a plurality of buffers associated respectively with each of a plurality of predefined impairment classes, one or more or the plurality of buffers defined to be limited-length queues
a memory manager to assign memory blocks to each of the plurality of buffers on an as needed basis; the memory manager is configured to limit a number of memory blocks assigned to each limited length queue to a respective predetermined maximum number,
a classifier to determine respective impairment classes of the received packets, the impairment class of each received packet being one of the predefined plurality of impairment classes;
an enqueue manager to associate metadata with each received packet and store each received packet and associated metadata in the respective buffer associated with the respective impairment class, the enqueue manager configured to discard received packets if the impairment class of the received packets is associated with a limited-length queue that is full; and
a dequeue manager configured to:
retrieve metadata associated with head-end packets, head-end packets being packets at the head ends of the plurality of buffers,
select one of the plurality of buffers based, at least in part, on the retrieved
retrieve the head-end packet from the selected buffer, and
provide the retrieved head-end packet to the network interface unit for transmission as impaired network traffic.

2. The impairment unit of claim 1, wherein the
memory manager is configured to maintain ordered lists of the memory blocks assigned to each of the plurality of buffers.

3. The impairment unit of claim 2, wherein a limited-length queue is considered to be full if a number of memory blocks assigned to the limited-length queue is equal to a respective maximum number and the limited length queue lacks sufficient space to store a newly received packet.

4. The impairment unit of claim 2, wherein the enqueue manager is configured
to maintain a plurality of write pointers, each write pointer uniquely associated with a corresponding buffer, each write pointer indicating a memory address at which packet data will next be written into the associated buffer, and
to request the memory manager to assign another memory block to the buffer associated with a given write pointer when the given write pointer points to the end of a memory block.

5. The impairment unit of claim 1, wherein
the dequeue manager is a portion of an integrated circuit,
the integrated circuit includes internal memory to store the metadata associated with the head-end packets and at least a portion of each head-end packet, and
at least some packets other than the head-end packets and associated metadata are stored in memory external to the integrated circuit.

6. The impairment unit of claim 5, wherein the memory manager is further to
retrieve a penultimate packet and associated metadata of the selected buffer from the external memory, and
write the retrieved penultimate packet into the internal memory in replacement of the head-end packet provided to the network interface unit.

7. A method of emulating network impairments using an impairment unit embedded in a communications path within a network, comprising:

receiving network traffic from a network;

storing packets received via the network interface in a traffic memory, the traffic memory physically partitioned into a plurality of memory blocks and logically partitioned into a plurality of buffers associated respectively with each of a plurality of predefined impairment classes, one or more or the plurality of buffers defined to be limited-length queues;

assigning memory blocks to each of the plurality of buffers on an as-needed basis, wherein a number of memory blocks assigned to each limited-length queue is limited to a respective predetermined maximum number;

determining respective impairment classes of the received packets, the impairment class of each received packet being one of the predefined plurality of impairment classes;

associating metadata with each received packet;

storing each received packet and associated metadata in the respective buffer associated with the respective impairment class;

discarding received packets if the impairment class of the received packets is associated with a limited-length queue that is full;

retrieving metadata associated with head-end packets, head-end packets being packets at the head ends of the plurality of buffers;

selecting one of the plurality of buffers based, at least in part, on the retrieved metadata;

retrieving the head end packet from the selected buffer; and transmitting the retrieved head-end packet as impaired network traffic.

8. The method of claim 7, wherein a limited-length queue is considered to be full if the number of memory blocks assigned to the limited-length queue is equal to the respective maximum number and the limited length queue lacks sufficient space to store a newly received packet.

9. The method of claim 7, further comprising:

maintaining a plurality of write pointers, each write pointer uniquely associated with a corresponding buffer, each write pointer indicating a memory address at which packet data will next be written into the associated buffer, and assigning another memory block to the buffer associated with a given write pointer when the given write pointer points to the end of a memory block.

10. The method of claim 7, further comprising:

maintaining ordered lists of the memory blocks assigned to each of the plurality of buffers.

11. The method of claim 7, wherein storing packets received via the network interface in a traffic memory further comprises:

storing metadata associated with the head end packets of every buffer and at least a portion of each head-end packet in an internal memory, the internal memory internal to an integrated circuit that includes circuits to perform the retrieving, selecting, and retrieving actions recited in claim 8; and storing packets other than the head-end packets and associated metadata in external memory, the external memory external to the integrated circuit.

12. The method of claim 11, wherein storing packets received via the network interface in a traffic memory further comprises:

retrieving a penultimate packet and associated metadata of the selected buffer from the external memory, and writing the retrieved penultimate packet into the internal memory in replacement of the transmitted head-end packet.

\* \* \* \* \*